April 29, 1952     H. R. RICARDO ET AL     2,594,681
INTERNAL-COMBUSTION ENGINE
Filed March 2, 1948     6 Sheets-Sheet 2
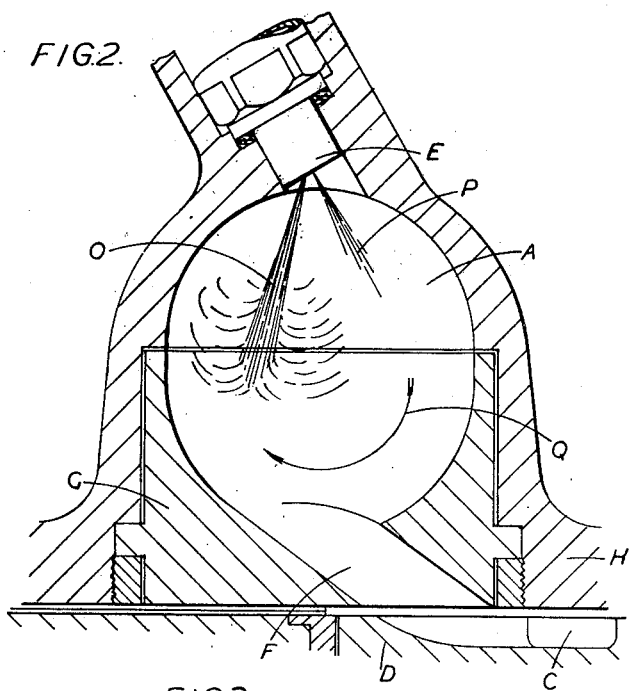
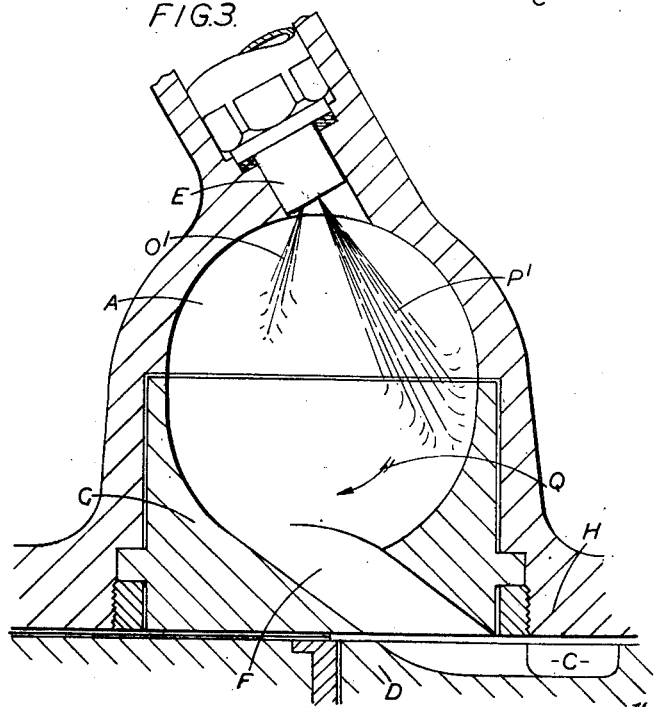

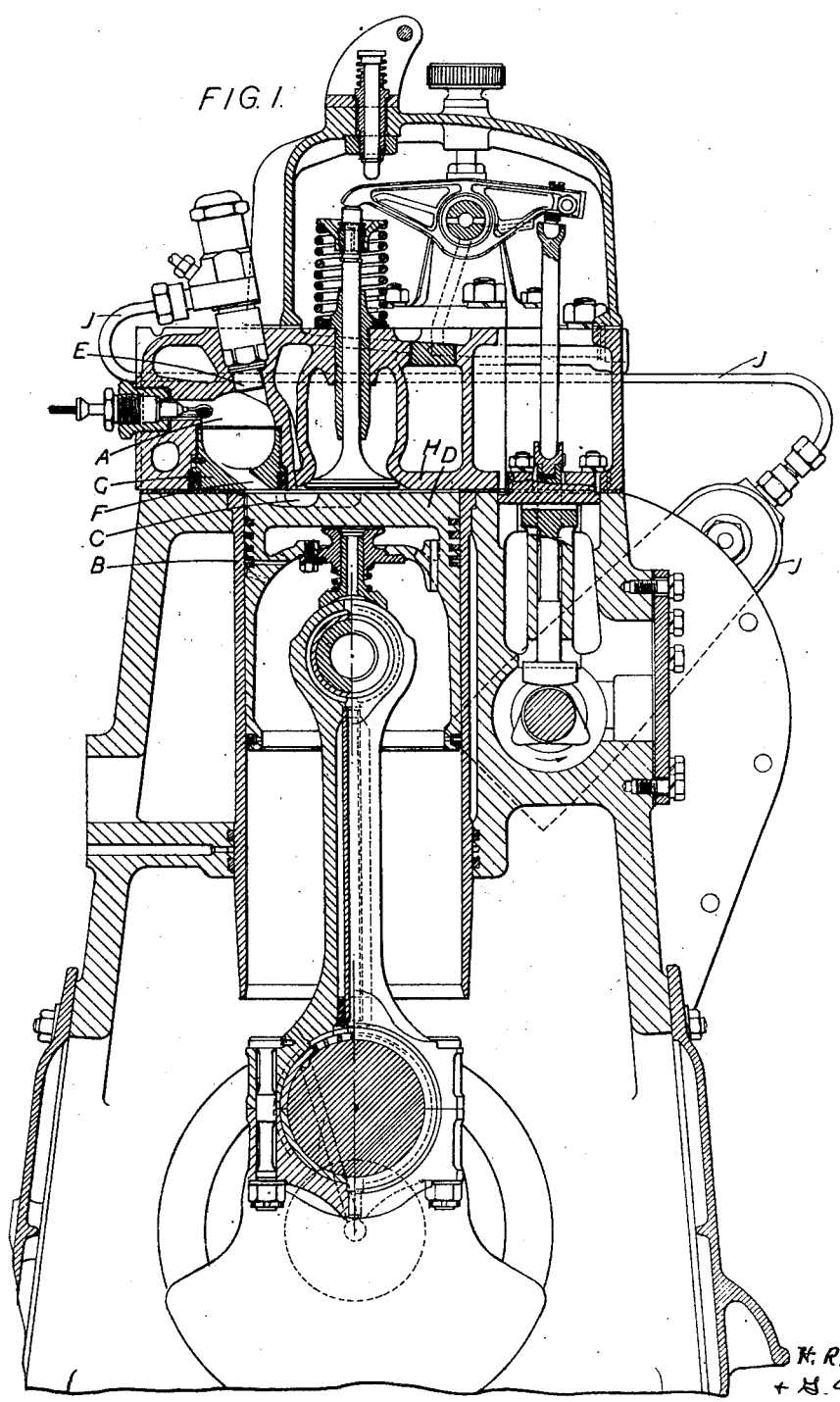

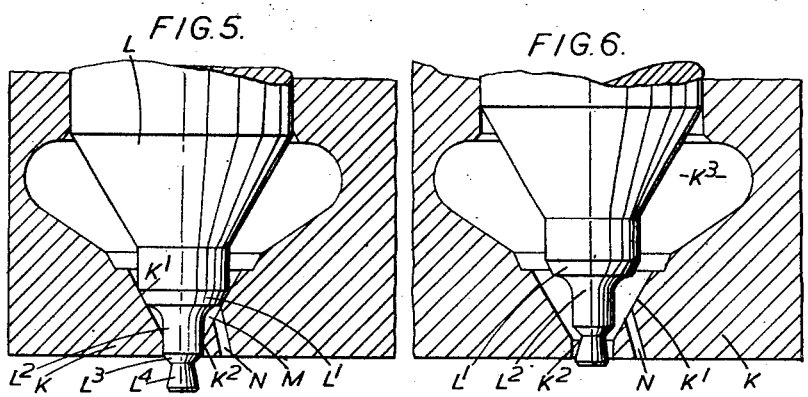
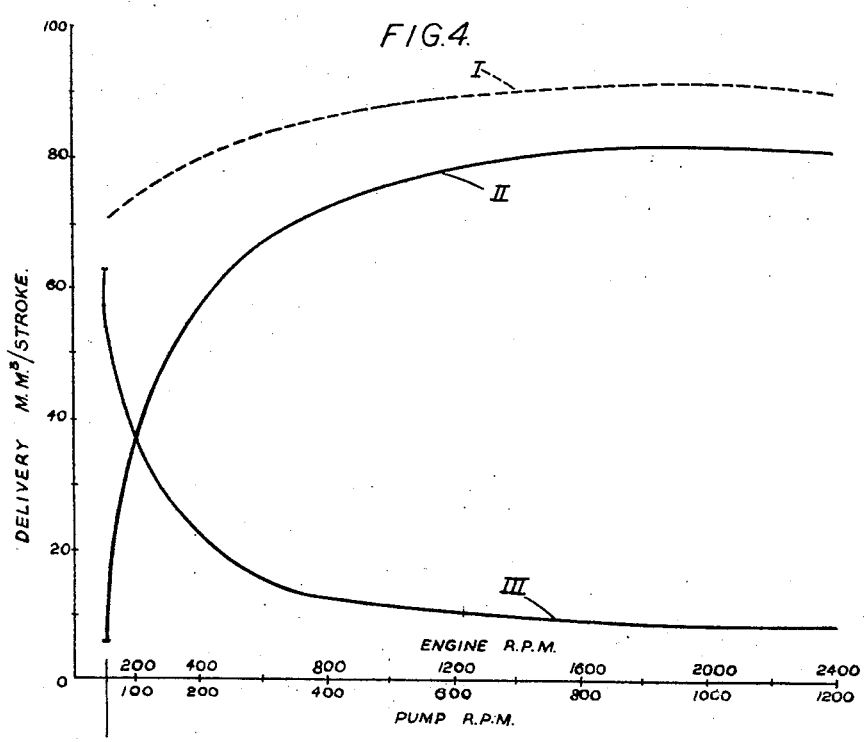

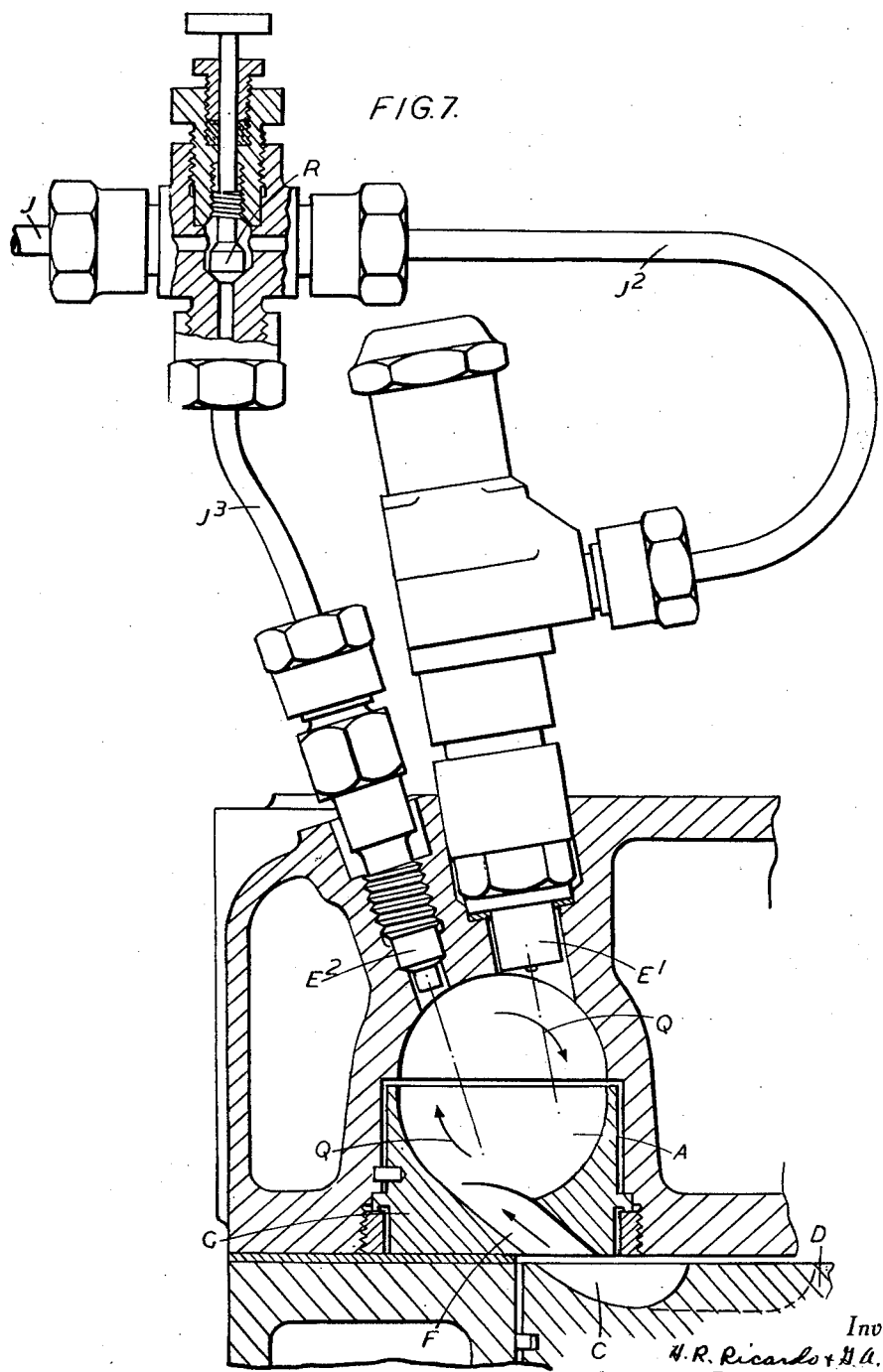

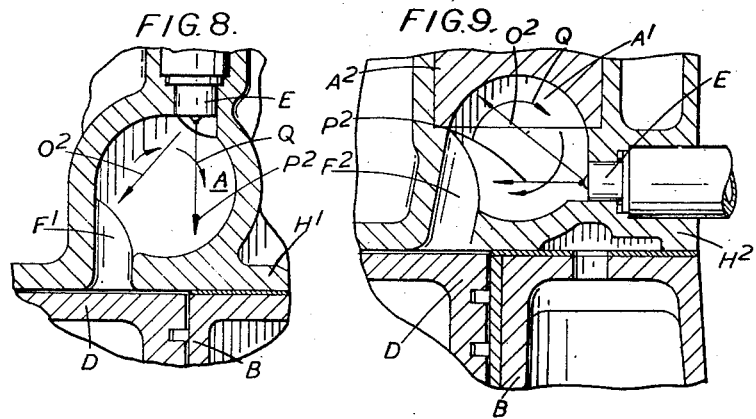
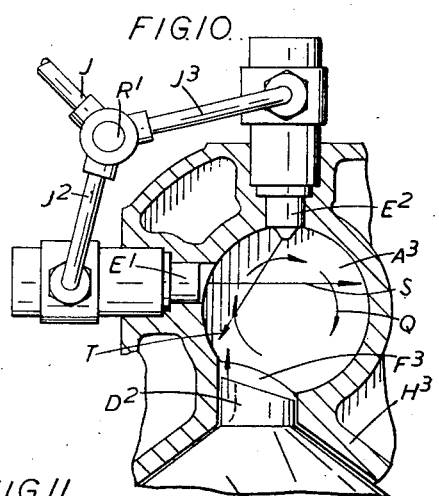
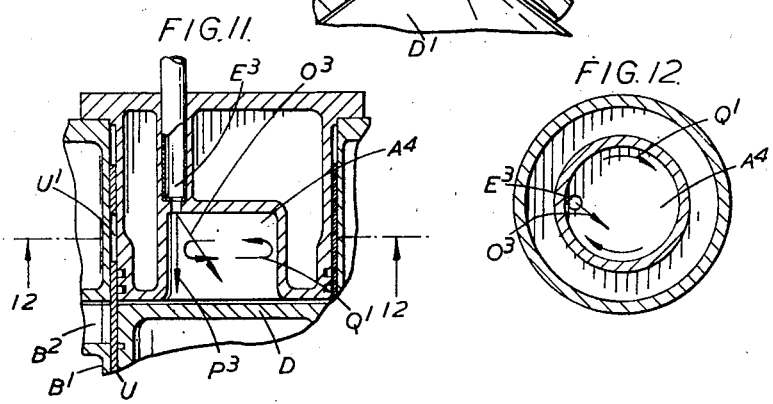

April 29, 1952  H. R. RICARDO ET AL  2,594,681
INTERNAL-COMBUSTION ENGINE
Filed March 2, 1948  6 Sheets-Sheet 6
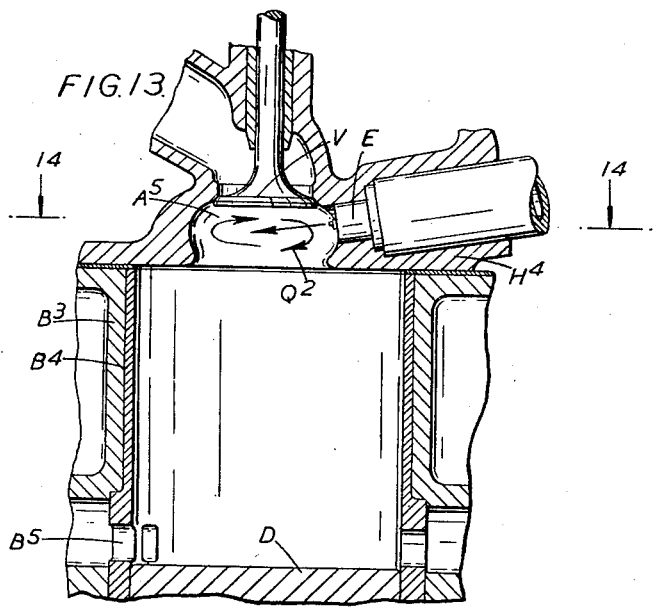
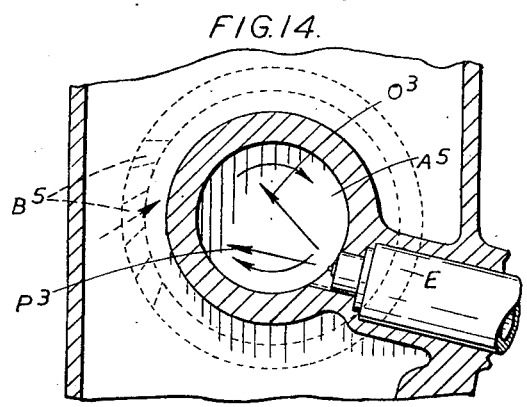
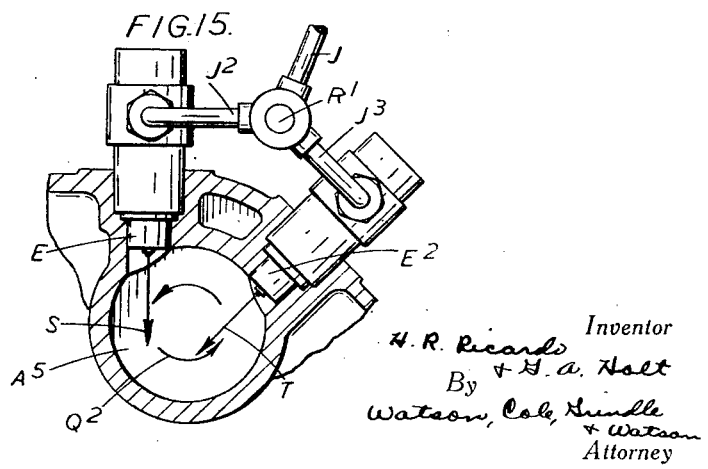

Patented Apr. 29, 1952

2,594,681

UNITED STATES PATENT OFFICE 2,594,681

INTERNAL-COMBUSTION ENGINE

Harry Ralph Ricardo, London, and George Allen Holt, Shoreham-by-Sea, England, assignors, by direct and mesne assignments, to Ricardo & Co. Engineers (1927) Limited, London, England, a company of Great Britain Application March 2, 1948, Serial No. 12,558
In Great Britain March 7, 1947

6 Claims. (Cl. 123—32)

This invention relates to internal combustion engines operating with compression ignition and has for its object to effect certain improvements in the delivery of the fuel into the combustion chamber which in certain engines of this type lies mainly or wholly outside the cylinder.

It has been found in engines of the above type that from the point of view of maximum power and maximum economy the most desirable direction in which the fuel should be delivered into the external combustion chamber is in a direction downstream with respect to the direction in which the air is whirling or rotating in the combustion chamber during the time that the fuel is being injected. By the term "downstream" is meant in the same direction as that in which the air is rotating and by the term "upstream" is meant in a direction opposed to or contrary to that in which the air is rotating. It is desirable that such a downstream fuel jet should be directed so that its axis lies tangential to a circle whose centre is coincident with the centre of the combustion chamber and whose radius has a length which is between one quarter and one half of the length of the radius of the circular contour of the interior of the combustion chamber. Such a downstream injection of fuel during normal running of the engine gives the best performance both as to power output and minimum fuel consumption, but in an engine of the type referred to, does not provide favourable conditions for starting the engine from cold. It has been found, however, that injection of fuel when directed upstream in regard to the rotating air is favourable to starting, but unfavourable for engine performance if the fuel is injected in any considerable quantity. Hence, the ideal arrangement to suit individually both starting and running conditions would appear to be to direct the whole of the fuel charge in an upstream direction when starting from cold, and to direct the whole of the fuel charge downstream when running at normal power outputs. Although the ideal arrangement would be as just stated, it has been found that a small quantity of fuel directed upstream during normal running will not affect maximum power output and efficiency adversely to any appreciable extent provided the quantity directed upstream is small relatively to the quantity of fuel directed downstream at one and the same time. For example, the quantity so directed upstream should preferably not exceed 10% to 15% of the total full load fuel being injected. Conversely, if when starting approximately 90% of the total fuel injected is directed upstream and approximately 10% is directed downstream, starting is not affected adversely to any appreciable extent.

It appears that the reason why the injection of fuel upstream in opposition to the direction of rotation of the air in the combustion chamber facilitates starting is as follows: It is reasonable to suppose and experiments have indicated, that in an engine of the general type referred to the hottest air in the combustion chamber towards the completion of the compression stroke will lie near the centre of the chamber.

The reasoning in support of this assumption is that the air contained in a cylindrical zone which lies along the axis about which the air revolves and which occupies a space appproximately equal to one half of the sphere radius may be considered as almost stationary in comparison with the rapidly revolving air at the periphery of the chamber. During the compression stroke the air in this central zone is compressed without being moved appreciably from its original position because the air entering by the tangential throat is deflected towards the periphery of the spherical chamber and thus to a great extent revolves round a comparatively stationary zone of air lying about the axis of the rotation which is subjected to the minimum heat loss because it is not in contact with the chamber wall. By injecting upstream the fuel spray will impact on the dense contrary whirling air and part of the spray in a finely atomised state will be deflected into or towards the central hot core of air in the centre of the chamber, thus promoting ready ignition of this portion of the fuel charge. The impact or collision between the upstream fuel spray and the dense contrary whirling air will also slow up this spray and reduce its tendency to penetrate the air and reach the chamber wall. Furthermore, the jet of finely atomised fuel will by this collision be dispersed and mixed more intimately with the air charge thus providing a body of mixture ready to support the ignition of the mixture initiated at the hot core.

According to this invention an internal combustion compression ignition engine of the type indicated is provided with fuel injection means such that at the low engine speeds which occur during the process of starting the major part of the fuel charge is injected in a direction opposed to the direction in which the air in the combustion chamber is whirling or rotating while when running on substantial load at normal running speeds, the major part of the fuel charge is injected in the same direction as that in which the air in the combustion chamber is rotating, this change in the direction of delivery of the major part of the fuel charge taking place automatically as a result of the increased rate of injection due to increased engine and consequently injection pump speed consequent on the attainment of normal running speeds.

The direction in which the upstream fuel jet is delivered is such that the axis of the jet of fuel lies tangential to a circle whose centre is approximately coincident with the centre of the combustion chamber and has a radius whose length is preferably not greater than one half of the length of the radius of the contour of the spherical ends of the combustion chamber. The reason for this preferred limitation of the radius is that with greater radii there is a tendency for the upstream fuel jet on collision with the contrary whirling air to be deflected on to the chamber wall rather than to be thoroughly dispersed and deflected towards the centre of the chamber.

The accompanying drawings illustrate by way of example how the invention may be carried out in practice. In these drawings:

Figure 1 is a vertical sectional elevation through the cylinder of an internal combustion engine operating with compression ignition and embodying the invention.

Figure 2 is a somewhat diagrammatic sectional elevation in the plane of the section in Figure 1 and on an enlarged scale showing the part of the combustion space which lies outside the cylinder and indicating the flow of fuel from the jet nozzle at starting.

Figure 3 is a view similar to Figure 2 but in which is indicated the delivery of fuel from the jet nozzle when the engine has attained normal running speed and power output.

Figure 4 is a graph in which is shown typical flow relationship between the fuel deliveries respectively through the auxiliary orifice in the jet nozzle and through the main orifice controlled by the pintle in the nozzle. The graph shows also the total delivery of fuel from the jet nozzle that is to say the sum of the separate deliveries through the two jet orifices.

Figure 5 is a somewhat diagrammatic longitudinal sectional elevation of the jet nozzle showing the needle valve seated and when no fuel flow can take place.

Figure 6 is a similar view but showing the needle valve fully lifted so as to permit free fuel flow.

Figure 7 is a part sectional elevation including the part of the combustion space which lies outside the cylinder and showing a modification in which two separate fuel injectors are used.

Figure 8 is a sectional elevation of a spherical combustion chamber in the end of the cylinder and having a single fuel injector mounted in the chamber, this injector being adapted to deliver fuel in two different directions.

Figure 9 is a similar view of a somewhat similar construction of combustion chamber and having a single fuel injector in a position differing from that in which it is shown in Figure 8.

Figure 10 is again a similar sectional elevation showing a spherical combustion chamber in the head of the cylinder and provided with two separate fuel injectors.

Figure 11 is a sectional elevation of the head of a cylinder in which is a combustion chamber having a cylindrical form and wherein the air is caused to circulate by the manner in which it is caused to enter the cylinder.

Figure 12 is a section on the line 12—12 in Figure 11 looking in the direction of the arrows.

Figure 13 is a sectional elevation of another construction showing a cylinder with ports in the wall thereof which are uncovered by the piston and in the head of the cylinder a combustion chamber in which the air whirls owing to the tangential arrangement of the inlet ports.

Figure 14 is a section on the line 14—14 in Figure 13 looking in the direction of the arrows.

Figure 15 is a section through a combustion chamber having a construction similar to that shown in Figure 13 but illustrating the arrangement of two separate fuel injectors.

The internal combustion engine illustrated in Figure 1 is a typical example of an engine operating with compression ignition and embodying certain characteristic features which comprise a combustion space of which the main part is constituted by the chamber A outside the cylinder B and the recesses C in the face of the piston D, the fuel being delivered from a jet nozzle E into the chamber A into which at the end of the compression stroke the main part of the air charge is forced through the passage F. This passage runs through a plug member G formed of heat-resisting material so mounted in the cylinder head H that there is no free flow of heat from the plug member. Fuel is supplied to the jet nozzle E through the pipe J from the fuel injection pump $J^1$. In the case of an engine operating on the four-stroke cycle this pump is driven at half engine speed.

The characteristic features of the jet nozzle can be seen in Figures 5 and 6. Within a casing K is a conical seating $K^1$ for a valve and beyond this seat is a central opening and cylindrical passage way $K^2$ constituting the main delivery passage for the fuel. The valve seat $K^1$ is arranged between the delivery passage $K^2$ and an annular chamber $K^3$ formed in the casing K around the needle valve and into which the fuel is delivered under pressure in the usual way. The needle valve comprises a body L with a conical valve $L^1$ formed on it and adapted to engage the seating $K^1$. Extending from the body L beyond the valve $L^1$ is a pintle having a cylindrical part $L^2$ which as seen in Figure 5 can enter and closely fit the delivery passage $K^2$, the pintle carrying at its end the cones $L^3L^4$. It can be seen in Figure 5 that when the needle L is positioned with the valve $L^1$ on the seat $K^1$ there is formed around the pintle $L^2$ and beyond the valve an annular chamber M. From this chamber a passage way N runs as a plain hole through the casing K at one side of the central delivery passage $K^2$. The axis of the auxiliary passage N lies at an angle to the axis of the needle L and of the main delivery passage $K^2$. The needle valve L is acted on in the usual way by a spring, not shown, and this spring tends to keep the valve $L^1$ on the seat $K^1$.

The construction operates in the following manner. When fuel is supplied under pressure into the chamber $K^3$ the whole needle lifts and when the valve $L^1$ leaves the seat $K^1$ fuel can enter the annular chamber M. Then at each delivery stroke of the fuel pump a discharge of fuel will take place through the auxiliary passage N in advance of the main discharge of fuel through the pintle-controlled passage $K^2$. This is due to the rapid building up of pressure in the chamber M which causes the discharge through the auxiliary passage N while the pintle $L^2$ is still obstructing the passage $K^2$. As soon as the closely fitting cylindrical portion $L^2$ of the pintle withdraws from the inner end of the cylindrical passage $K^2$, discharge of fuel through that passage will begin and increase as the fuel discharge through the auxiliary passage N falls off. This is due to the fact that the resistance of the pintle controlled orifice $K^2$ progressively becomes relatively less than the resistance to flow through the auxiliary passage N as the pintle is progressively withdrawn back from the inner end of this passage during the continued lifting of the needle valve.

According to this invention this nozzle construction may be used in the type of engine indicated to obtain automatically a desirable change in the fuel delivery into the combustion chamber A first when the engine is started and afterwards as it speeds up and runs on normal power outputs.

Referring to the graph shown in Figure 4, this illustrates the behaviour of one jet nozzle when supplied with fuel by a single plunger pump. The total delivery curve I shows the quantity delivered by the pump at each stroke of the pump at various speeds, this delivery being expressed in cubic millimetres per stroke of the pump. The curve II shows the quantity delivered through the main pintle-controlled orifice per stroke of the pump. The curve III shows the quantity delivered through the auxiliary passage N per stroke of the pump. At any given speed the sum of the values shown at that speed on the curves II and III is equal to the value shown on the curve I at the same speed.

In starting a compression ignition engine of the type to which the present invention refers it is usual to turn over the engine as by motor at a speed of about 100 revolutions per minute. At this speed, in the case of an engine operating on the four-stroke cycle, as can be seen from the graph Figure 4, the pump when running at 50 revolutions per minute, delivers about 70 cubic millimetres of fuel per stroke and of this amount 63 cubic millimetres, or 90% of the fuel delivered is discharged through the auxiliary passage N while only 7 cubic millimetres or 10% is delivered through the main orifice controlled by the pintle. Under these conditions, that is to say those which obtain at an engine speed of 100 revolutions per minute, the disposition of the fuel sprays and their relative proportions are as diagrammatically indicated in Figure 2 where O represents the spray jet delivering through the auxiliary passage N the larger amount of fuel upstream and P represents the relatively small fuel spray then delivered through the main passage $K^2$ in the downstream direction in the chamber A.

It has already been pointed out that the hottest air in the chamber A may be expected to be located near the centre of the chamber. It will be realised that an appreciable quantity of the fully atomised portion of the spray O coming from the auxiliary passage N and delivered upstream of the air swirl which is taking place in the direction indicated by the arrow Q, will be carried back towards the centre of the chamber by the air charge which is whirling round in the chamber. As the engine speed builds up from the starting speed the relative proportions of fuel delivered respectively through the main orifice $K^2$ and the auxiliary passage N charge in the manner indicated by the curves II and III in Figure 4. When a high engine speed of the order of 2000 to 2400 revolutions per minute has been reached in the case illustrated in the graph, the proportions of fuel delivered by the two orifices has changed as shown by the curves II and III and the relation of the deliveries by the two orifices is diagrammatically indicated by the sprays $O^1$ and $P^1$ in Figure 3.

As may be seen from Figures 2 and 3, by suitable disposition of the passage N in relation to the central delivery passage $K^2$ and by suitably placing the whole nozzle in the wall of the combustion chamber A, the fuel issuing from the passage N will be delivered as shown as a jet directed upstream and in the desired radial position across the combustion chamber and towards the wall of the plug G. On the other hand fuel delivery through the main orifice $K^2$ will be directed downstream as a jet whose axis across the combustion chamber is then in the desired radial position referred to above. Hence the nozzle operates automatically to provide at the low engine speeds which obtain when starting from cold the desired upstream fuel jet in the quantity initially required, but when the engine speed rises as it assumes running under normal conditions and the rate of fuel supply consequently increases, the quantity per cycle delivered in the downstream jet from the main orifice $K^2$ will increase. At the same time the quantity per cycle delivered through the auxiliary orifice N will decrease.

With a fixed setting of the fuel injection pump control to deliver the desired quantity of fuel for maximum power and speed, the proportion of fuel delivered by the downstream jet $P^1$ and the upstream jet $O^1$ may respectively be approximately as 85 to 15. On the other hand at the low rate of fuel injection which is obtained at the low engine and consequently low pump speeds which exist when starting, the proportion is 10 in the downstream jet P and 90 in the upstream jet O.

Figure 7 illustrates a modification in which the fuel is delivered in the desired manner by means of two separate fuel injectors $E^1$ and $E^2$ which have dissimilar pressure flow characteristics. One of these injectors $E^1$ is arranged to deliver in a downstream direction, that is in the direction indicated by the arrows Q as that in which the air is whirling which has been forced into the combustion chamber A. The other injector $E^2$ is arranged to deliver fuel in the upstream direction, that is opposite to the direction indicated by the arrows Q. The two injectors are simultaneously supplied with fuel through branches $J^2$ and $J^3$ from one main supply pipe J which runs from a fuel injection pump of the plunger type as indicated at $J^1$ in Figure 1. The arrangement is such that when the rate of fuel supply increases the proportion of the total amount of fuel which is delivered downstream by the one injector $E^1$ increases while the proportion of the total amount of fuel which is delivered upstream by the other injector $E^2$ decreases. Further, the arrangement and operation of the upstream and downstream injectors is such that at low rates of fuel supply the upstream injector $E^2$ may deliver fuel into the combustion chamber A in preference to the delivery of fuel by the downstream injector $E^1$.

As shown for example in the engine construction illustrated in Figure 7, the combustion chamber A is provided with an injector $E^1$ preferably of the pintle type and placed so as to deliver a fuel spray downstream, that is to say in the direction indicated by the arrows Q as that in which the air is whirling when it has been forced into the chamber A through the passage F during the compression stroke of the piston D. There is also in the combustion chamber A another injector E² which is conveniently of a type differing from the injector E¹. This injector E² is placed as shown so as to deliver a fuel spray in the upstream direction, that is in a direction opposite to that indicated by the arrows Q as that in which the air in the chamber is whirling. This upstream injector may be of the type of nozzle having the characteristics associated with a spring-loaded valve controlling the flow through a plain hole. Both the injectors E¹ and E² are connected by piping J²J³ to a common pipe J which leads from a single plunger pump of some known type. The flow characteristics of the two injectors E¹ and E² are such that when the rate at which the fuel is supplied by the pump through the pipe J is increased the proportion of the total amount of fuel supplied which is discharged from the downstream nozzle E¹ will tend to increase while the proportion of the total amount of the fuel supplied which is discharged from the upstream nozzle E² having the plain hole delivery characteristic will tend to decrease.

Preferably the initial spring loading or opening pressure of the downstream injector E¹ is arranged to be higher than the opening pressure of the injector E² which delivers upstream so that when there is a rise in the pressure of the fuel in the common pipe line J from the single pump fuel will be delivered by the upstream injector E² in preference to the supply of fuel by the downstream injector E¹. The effect of this arrangement is that at starting when the rate of fuel supply is low by reason of the engine speed being low, and also at high engine speeds if the pump is set to deliver very small quantities of fuel, then the whole of the fuel delivered by the pump may be discharged by the upstream injector E² and no fuel discharged by the downstream injector E¹.

At the low engine speeds which exist at starting, for example 100 R. P. M., the rate of fuel supplied by the pump is such that the pressure in the fuel pipe J will not reach a value sufficient to effect discharge from the downstream injector E¹ and the whole of the delivery can take place through the upstream injector E². As the rate at which the fuel is supplied by the pump is increased, for example owing to increased engine speed, the resistance to the increased flow which is offered by the upstream injector E², owing to its plain hole characteristic, causes the pressure in the pipe line to rise and when the rate at which the fuel is supplied reaches a certain value, the pressure will be sufficient to cause the downstream injector E¹ to begin delivery. Thereafter with further increase in the rate of fuel supply the proportion of the total amount of fuel supplied which is discharged from the downstream injector E¹ will increase while the proportion of the total supply which is discharged from the upstream injector E² will decrease.

In certain cases the downstream nozzle E¹ may be of the known delay action type while the upstream nozzle E² may be of a type having a plain hole pressure-flow characteristic. In such cases the opening pressure lifting the needles from their seats in the nozzles against the spring loading may be the same in both nozzles. Then owing to the delay characteristic of the downstream nozzle E¹ the fuel at low rates of supply will be discharged by the upstream nozzle E² in preference to delivery of fuel by the downstream nozzle, the degree of preference being determined by the length of the close fitting part L² of the pintle as in the construction shown in Figures 5 and 6, in combination with the size of the plain hole orifice of the upstream nozzle E² and the spring rate of the delay action nozzle E¹.

With all the arrangements of nozzles above described and under certain conditions, for example at low rates of fuel supply as occur at idling or at no load or very light loads with small injection quantities, the whole of the fuel pump delivery will take place by way of the upstream injection orifice and no delivery will take place by way of the downstream injection orifice.

When idling or running at light loads or no loads at any engine speed the temperature attained by the heat insulated plug member of the combustion chamber which is outside the cylinder is much lower than on normal load running conditions. Under these conditions the delivery of the fuel upstream where is meets the hotter air near the centre of the chamber eliminates any tendency to misfire.

In some cases the upstream injector E² may be of a known type in which the nozzle has a spring-loaded valve with a restricted lift and opening in the outward direction. A nozzle with a valve of this kind can be given a characteristic which is substantially similar to that of a nozzle having a plain hole.

With the two injectors it may be convenient to provide a valve R which may be operated manually or otherwise to enable the upstream injector E² to be put out of action after the engine has started.

Referring to Figure 8, the combustion chamber A is spherical and mounted in the end H¹ of the cylinder with which the chamber A is in communication through a passage F¹ which leads tangentially into the chamber. In this case and as distinct from the construction shown in Figures 1, 2 and 3, the passage F¹ runs in a direction substantially parallel to the axis of the cylinder B. The arrangement is such that during the instroke of the piston D the air charge in the cylinder will be forced through the passage F¹ into the chamber A so that this air will rotate or whirl in the chamber in the direction indicated by the arrow Q and substantially about the centre of this chamber. In the chamber is mounted a single fuel injector E constructed as described above more particularly with reference to Figures 5 and 6 and delivering two separate fuel jets as indicated by the arrows P² and O². The jet P² is delivered downstream with respect to the direction indicated by the arrow Q in which the air is whirling in the chamber A. The jet O² on the other hand is directed upstream in opposition to the direction in which the air is whirling in the chamber.

Referring to Figure 9 the general formation and arrangement of the combustion chamber A¹ in the head H² of the cylinder is similar to that shown in Figure 8, that is to say it is conveniently spherical but is constituted as to one part which lies remote from the end of the cylinder B by a plug A² which is not directly cooled and may thus retain heat and assist in the combustion in a known manner. In this case the passage F² leading tangentially into the chamber A¹ runs somewhat at an angle to the axis of the cylinder B. Here again fuel is injected through a single injector E having a main and auxiliary passage in the nozzle as shown in Figures 5 and 6 and delivering separate jets from the nozzle as indicated by the arrows P² and O². The jet P² is delivered downstream with respect to the air in the chamber which is whirling in the direction indicated by the arrow Q, while the jet $O^2$ is delivered in a direction upstream with respect to this whirling air.

In Figure 10 is again shown a spherical combustion chamber $A^3$ disposed in the head $H^3$ of the cylinder which in this case is formed conical. The passage $F^3$ leads tangentially into the chamber $A^3$ from the centre of the conical head $H^3$. Air from the cylinder is forced into the chamber $A^3$ through the passage $F^3$ by the piston $D^1$ which has a conical formation corresponding to the formation of the head $H^3$ of the cylinder and the piston is also provided with a central projection $D^2$ adapted to enter at least part of the passage $F^3$ as shown in Figure 10 at the end of the in-stroke. The air in the chamber $A^3$ rotates approximately about the centre of the chamber in the direction indicated by the arrow Q.

In this case there are mounted in the combustion chamber $A^3$ two separate fuel injectors $E^1$ and $E^2$. These injectors are constructed similarly to those shown and described in Figure 7 and in the same way deliver fuel jets downstream and upstream with respect to the direction in which the air is whirling in the chamber $A^3$. The direction of the jet issuing from the injector $E^1$ is indicated by the arrow S while the direction of the jet issuing from the injector $E^2$ is indicated by the arrow T. As in the case of the two injectors shown in Figure 7 the injectors $E^1$ and $E^2$ are here supplied with fuel from a single pump of the plunger type delivering through a pipe J from which branches $J^2$ and $J^3$ lead respectively to the injectors $E^1$ and $E^2$. At $R^1$ is a valve of some convenient structure such as that shown at R in Figure 7 by means of which the fuel flow from the pipe J to the branch $J^3$ and injector $E^2$ can be cut off.

In Figure 11 the invention is shown as applied to an engine with a combustion chamber which has a form different from that shown in the constructions described and illustrated in Figures 1 to 10. The combustion chamber $A^4$ is cylindrical with its axis substantially coincident with the axis of the cylinder $B^1$ and the end of the chamber is fully open to the cylinder. In this known construction the piston D lies within a reciprocating sleeve valve U in which are ports $U^1$ adapted to register with ports $B^2$ in the wall of the cylinder B and through these ports the gases can flow to exhaust. Similar ports (not shown) in the sleeve valve U and in the wall of the cylinder admit the air charge in a known manner which causes this air as it enters the cylinder to whirl about the cylinder axis. This air as it is forced on the in-stroke of the piston D into the combustion chamber $A^4$ will whirl as indicated by the arrow $Q^1$ in a similar way about the axis of the chamber $A^4$. A single fuel injector $E^3$ is mounted as shown with its axis substantially parallel to the axis of the chamber $A^4$. This injector is of the construction described above and illustrated in Figures 5 and 6 and thus delivers fuel jets in two different directions of which one is indicated by the arrow $P^3$ and the other jet by the arrow $O^3$. The fuel jet $P^3$ is directed substantially in the axial direction with respect to the cylinder $B^1$ and chamber $A^4$ and thus in effect across and somewhat downstream with respect to the direction in which the air is whirling in the chamber $A^4$. On the other hand the jet $Q^3$ is so directed, as can be seen in Figure 12, as to be delivered in a direction opposite to that in which the air is whirling.

Referring now to Figures 13 and 14 these illustrate yet another formation of combustion chamber and the manner in which the invention may be applied thereto. The combustion chamber $A^5$ has the form of a figure of revolution about an axis substantially coincident with the axis of the cylinder $B^3$. A poppet valve V controlling the flow of exhaust gases from the chamber $A^5$ is situated in a port in this chamber, this port being positioned opposite to the opening in the cylinder head $H^4$ through which the chamber communicates with the end of the cylinder. In this case the cylinder $B^3$ is shown as provided with a liner $B^4$ having ports $B^5$ situated where they will be uncovered by the piston D towards the end of its out-stroke. The ports $B^5$ are tangentially arranged as indicated in Figure 14 so that the air entering the cylinder at the end of the induction stroke has imparted to it a whirling motion in the cylinder about the cylinder axis. Consequently this air when forced by the piston towards the end of the in-stroke into the chamber $A^5$ has a whirling motion in that chamber as indicated by the arrow $Q^2$. In the cylinder head $H^4$ there is a single fuel injector E constructed for example as shown in Figures 5 and 6 and adapted to deliver fuel jets in two different directions as shown by the arrows $P^2$ and $O^2$ in Figure 14. As in the previously described constructions the jet $P^3$ is delivered in a direction downstream with respect to the direction in which the air is whirling as shown by the arrow $Q^2$, while the jet $O^2$ is delivered upstream against the whirling air.

In Figure 15 is shown a combustion chamber $A^5$ which may have a formation similar to that shown in Figure 13 and hence the air forced into the chamber will have a whirling motion as indicated by the arrow $Q^2$ about the centre of the chamber, this whirling motion being due to the manner in which the air enters the cylinder through the tangential inlet ports. The chamber $A^5$ is here provided with two separate fuel injectors $E^1$ and $E^2$ constructed and arranged conveniently as shown and described with reference to Figure 10. That is to say, the injector $E^1$ delivers a fuel jet S in a downstream direction relatively to the direction in which the air is whirling in the chamber $A^5$ while the injector $E^2$ delivers a jet indicated by the arrow T in a direction upstream with respect to this whirling air. Fuel from a single pump is supplied to these two injectors through a common pipe J and branches $J^2$, $J^3$ with a valve situated at $R^1$ which enables the fuel supply to the injector $E^2$ to be cut off.

What we claim as our invention and desire to secure by Letters Patent is:

1. In an internal combustion engine operating with compression ignition and comprising a cylinder, a combustion space constituted at least partly by a chamber external to the cylinder and into which at least a substantial part of the air charge is forced by the piston at the end of its instroke, means for causing the air charge to whirl about a center in said chamber, the combination with means for injecting fuel into said chamber including fuel injection nozzle means having at least two injection orifices, including an upstream orifice of which the axis has a substantial component in a direction opposite to that in which the air charge rotates in the combustion chamber, and another orifice of which the axis has no substantial component in a direction opposite to that in which the air charge rotates in the combustion chamber, of valve means controlling the flow of fuel to the two orifices and opening automatically in response to increase in fuel pressure, the cross sectional area of the upstream orifice being invariable by the valve means and small in relation to that of the other orifice, said valve means including a part projecting into the said other orifice and serving to increase its effective cross-sectional area as the valve opens with increases in fuel pressure above a predetermined value, and a single pump of the plunger type driven by the engine and delivering fuel to the said fuel injection means, the valve means opening the upstream injection orifice at a lower fuel pressure than that at which it opens the other orifice, whereby at low rates of fuel delivery the upstream injection orifice only opens, whereas the higher rates of fuel injection the resistance to flow through the upstream orifice causes fuel pressure to be built up until the other injection orifice is opened and, for pressure increases above that just sufficient to open said other orifice, the effective cross section of said other orifice is increased with increase in pressure.

2. An internal combustion engine operating with compression ignition and comprising the features set forth in claim 1, in which the said means for injecting fuel into the chamber are constituted by an injector having two delivery orifices one of which is of larger cross-section than the other, the axis of the larger delivery orifice having no substantial component in a direction opposite to that in which the air charge rotates in the chamber while the axis of the smaller orifice has a substantial component in a direction opposite to that in which the air charge rotates in the chamber, an axially movable valve coaxial with the larger orifice and controlling the supply of fuel to both orifices, said valve being opened automatically by fuel pressure, a cylindrical part on said valve which projects into the larger orifice and closes it when the valve is closed and for a predetermined degree of opening of the valve, but which is withdrawn from the larger orifice when the valve opens beyond said predetermined extent to increase the effective cross-sectional area of such larger orifice.

3. An internal combustion engine operating with compression ignition and comprising the features set out in claim 1, in which the means for injecting fuel into the chamber comprises two separate fuel injection devices each having an injection orifice and a valve controlling the supply of fuel to said orifice and opened by the fuel pressure, the cross-sectional area of one orifice being small in relation to that of the other orifice and the injectors being disposed with the axis of the larger orifice having no substantial component in a direction opposite to that in which the air charge rotates in the chamber while the axis of the smaller orifice has a substantial component in a direction opposite to that in which the air charge rotates in the chamber, the valve controlling the flow of fuel to the larger orifice being arranged coaxially with that orifice and being provided with a pintle controlling the effective cross-sectional area of the orifice so as to increase such effective cross-sectional area automatically with rises in fuel pressure above a predetermined value, while the effective cross-sectional area of the smaller orifice is invariable by the valve associated with it, and means for delivering fuel simultaneously from a common source to both injectors, the arrangement being such that the valve associated with the smaller orifice permits flow of fuel therethrough at a lower pressure than that at which the valve associated with the larger orifice permits flow of fuel therethrough.

4. An internal combustion engine operating with compression ignition and comprising a cylinder, a combustion chamber external to the cylinder and arranged in the cylinder head, this chamber being generally circular in cross section and communicating with the cylinder through a passage which leads tangentially into the chamber so that during the compression stroke of the piston in the cylinder at least a substantial part of the air charge will be forced through the tangential passage into the said combustion chamber, wherein this air will then whirl about the axis of the chamber, and means for injecting fuel into said combustion chamber including fuel injection nozzle means having two injection orifices the axis of one of which has a substantial component in the direction in which the air rotates in the combustion chamber to effect downstream injection, while the axis of the other has a substantial component in a direction opposite to that in which the air rotates in the combustion chamber to effect upstream injection, and valve means controlling the flow of fuel to the two orifices and opening automatically under fuel pressure, the cross-sectional area of the upstream orifice being invariable by the valve means and small in relation to that of the downstream orifice, while the valve means includes a part projecting into the downstream orifice and serving to increase its effective cross-sectional area as the valve moves with increases in fuel pressure above a predetermined value, and a single pump of the plunger type driven by the engine and delivering fuel to the said fuel injection means, the valve means opening the upstream injection orifice at a lower fuel pressure than that at which it opens the downstream orifice, whereby at low rates of fuel delivery fuel flows only through the upstream injection orifice, whereas for higher rates of fuel injection the resistance to flow through the upstream orifice causes fuel pressure to be built up until the downstream injection orifice is opened, and, for pressure increases above that just sufficient to open the downstream orifice, the effective cross section of said downstream orifice increases with increases in pressure.

5. An internal combustion engine operating with compression ignition as claimed in claim 4, in which the means for injecting fuel into the combustion chamber comprises two separate fuel injection devices each having an injection orifice and spring pressed valve controlling the supply of fuel to said orifice and arranged to be opened by fuel pressure, the cross-sectional area of one orifice being small in relation to that of the other orifice and the injectors being disposed with the axis of the larger orifice directed downstream while the axis of the smaller orifice is directed upstream, the valve controlling the flow of fuel to the larger orifice being arranged coaxially with that orifice and being provided with a pintle controlling the effective cross-sectional area of the orifice to increase such effective cross-sectional area automatically with rises in fuel pressure above a predetermined value, while the effective cross-sectional area of the smaller orifice is invariable, and means for delivering fuel simultaneously from a common source to both injectors, the arrangement being such that the valve associated with the smaller orifice permits flow of fuel therethrough at a lower pressure than that at which the valve associated with the larger orifice permits flow through its orifice.

6. An internal combustion engine operating with compression ignition and comprising a cylinder having inlet ports which are uncovered by the piston during its outstroke and are formed so that the air which enters therethrough will rotate about the axis of the cylinder, a combustion chamber in the cylinder head approximately coaxial with the cylinder, and into which at least a substantial part of the air charge is forced by the piston at the end of its instroke, the combustion chamber having a contour conforming substantially to a surface of revolution described about an axis parallel and adjacent to that of the cylinder and opening directly into the cylinder and means for injecting fuel into the said combustion chamber comprising fuel injection nozzle means having at least two injection orifices, the axis of one of which has no substantial component in a direction opposite to that in which the air charge rotates in the combustion chamber, while the axis of the other has a substantial component in a direction opposite to that in which the air charge rotates in the combustion chamber, and valve means controlling the flow of fuel to the two orifices and arranged to be opened by fuel pressure, the cross-sectional area of the upstream orifice being invariable by the valve means, while the valve means includes a part projecting into the other orifice and serving to increase its effective cross-sectional area as the valve moves with increases in fuel pressure above a predetermined value, and a single pump of the plunger type driven by the engine and delivering fuel to the said fuel injection means, the valve means opening the upstream injection orifice at a lower fuel pressure than that at which it opens the other orifice whereby at low rates of fuel delivery the upstream injection orifice only opens whereas for higher rates of fuel injection the resistance to flow through the upstream orifice causes fuel pressure to be built up until the other injection orifice is opened and, for pressure increases above that just sufficient to open said other orifice, the effective cross section of said other orifice will increase with increases in pressure.

HARRY RALPH RICARDO.
GEORGE ALLEN HOLT.

REFERENCES CITED

The following references are of record in the file of this patent:

UNITED STATES PATENTS

| Number | Name | Date |
|---|---|---|
| 1,096,585 | Yost et al. | May 12, 1914 |
| 1,378,176 | Kent-Norris | May 17, 1921 |
| 2,058,487 | Mock | Oct. 27, 1936 |
| 2,125,293 | Hesselman | Aug. 2, 1938 |
| 2,336,883 | Oram | Dec. 14, 1943 |

FOREIGN PATENTS

| Number | Country | Date |
|---|---|---|
| 638,257 | Germany | Nov. 12, 1936 |